(12) United States Patent
Inoue et al.

(10) Patent No.: US 11,812,131 B2
(45) Date of Patent: Nov. 7, 2023

(54) DETERMINATION OF APPROPRIATE IMAGE SUITABLE FOR FEATURE EXTRACTION OF OBJECT FROM AMONG CAPTURED IMAGES IN WHICH OBJECT IS DETECTED

(71) Applicant: NEC Corporation, Tokyo (JP)

(72) Inventors: Keiko Inoue, Tokyo (JP); Takashi Shibata, Tokyo (JP); Shoji Yachida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 17/420,219

(22) PCT Filed: Nov. 20, 2019

(86) PCT No.: PCT/JP2019/045470
§ 371 (c)(1),
(2) Date: Jul. 1, 2021

(87) PCT Pub. No.: WO2020/149001
PCT Pub. Date: Jul. 23, 2020

(65) Prior Publication Data
US 2022/0070364 A1    Mar. 3, 2022

(30) Foreign Application Priority Data

Jan. 17, 2019    (JP) ................ 2019-005778

(51) Int. Cl.
*H04N 5/232* (2006.01)
*G06K 9/00* (2022.01)
*H04N 23/611* (2023.01)
*G06V 40/16* (2022.01)
(Continued)

(52) U.S. Cl.
CPC ........ *H04N 23/611* (2023.01); *G06V 40/169* (2022.01); *H04N 23/69* (2023.01); *H04N 23/695* (2023.01)

(58) Field of Classification Search
None
See application file for complete search history.

(56) References Cited

U.S. PATENT DOCUMENTS

| 2016/0247288 | A1* | 8/2016 | Omori ................ H04N 1/3871 |
| 2016/0255303 | A1* | 9/2016 | Tokui ................ H04N 5/23229 348/14.01 |
| 2017/0244991 | A1* | 8/2017 | Aggarwal ............. G06V 40/23 |

(Continued)

FOREIGN PATENT DOCUMENTS

| JP | 2008-199549 A | 8/2008 |
| JP | 2013-101551 A | 5/2013 |
| JP | 2017-076901 A | 4/2017 |

OTHER PUBLICATIONS

International Search Report for PCT Application No. PCT/JP2019/045470, dated Dec. 24, 2019.

*Primary Examiner* — Edemio Navas, Jr.

(57) ABSTRACT

An information processing apparatus (2000) detects an object (30) from each of a plurality of captured images (20) generated by an image capture apparatus (10). The information processing apparatus (2000) further determines, for each detected object (30), an appropriate image being a captured image (20) suitable for feature extraction of the object (30) from among a plurality of captured images (20) in which the object (30) is detected.

17 Claims, 7 Drawing Sheets

(51) Int. Cl.
*H04N 23/69* (2023.01)
*H04N 23/695* (2023.01)

(56) References Cited

U.S. PATENT DOCUMENTS

2018/0157939 A1* 6/2018 Butt .................... G06V 10/75
2020/0286254 A1* 9/2020 Yamada ............... G06V 10/50

* cited by examiner

DETERMINATION OF APPROPRIATE IMAGE SUITABLE FOR FEATURE EXTRACTION OF OBJECT FROM AMONG CAPTURED IMAGES IN WHICH OBJECT IS DETECTED

This application is a National Stage Entry of PCT/JP2019/045470 filed on Nov. 20, 2019, which claims priority from Japanese Patent Application 2019-005778 filed on Jan. 17, 2019, the contents of all of which are incorporated herein by reference, in their entirety.

TECHNICAL FIELD

The present invention relates to image analysis.

BACKGROUND ART

A system recognizing a target object by using a captured image generated by a camera has been developed. Recognition of a target object using a captured image is performed by extracting a feature of an image area representing an object from a captured image and analyzing the feature. For example, a feature of an object is color, an edge (contour), or a surface texture.

Literatures disclosing a related art related to a recognition system using a captured image include Patent Document 1. A system in Patent Document 1 selects a plurality of images of the face of the same person captured from directions different from one another from a surveillance video and outputs the selected images. Image selection is performed in consideration of image quality in addition to the direction of the face. By thus outputting a plurality of facial images, a surveillant can readily perform personal identification.

Further, the system in Patent Document 1 performs personal authentication by constructing a three-dimensional shape model of the head of a person by using the aforementioned plurality of selected images, generating, from the three-dimensional shape model, a facial image viewed from the same angle as that from which a facial photograph of the person being a surveillance target is taken, and comparing the generated facial image with the facial photograph.

RELATED DOCUMENT

Patent Document

[Patent Document 1] Japanese Unexamined Patent Publication No. 2008-199549

SUMMARY OF THE INVENTION

Technical Problem

When object recognition processing takes a long time in a system involving object recognition, the object recognition processing becomes a bottleneck, and convenience of the entire system and the like declines. For example, when object recognition processing takes a long time in a case that an object being a recognition target is moving, the object significantly moves away from the recognized location by the time the object recognition result is known, and therefore the recognition result cannot be effectively utilized. Therefore, when an object is recognized in detail and the recognition result is utilized in an actual environment, the object needs to be brought to a standstill or movement of the object needs to be intentionally controlled, in a period in which the recognition processing is executed. Consequently, an operation of the entire system slows down and/or an operation method of the system becomes complex.

In view of the above, the present inventor found that efficiency of object recognition processing needs to be enhanced. In this respect, the system in Patent Document 1 selects a facial image for the purpose of allowing a surveillant to identify (exercise surveillance over) the face of a person from various directions and constructing a three-dimensional shape model of the face of the person and makes no mention of enhancing efficiency of object recognition.

The present invention has been made in view of the aforementioned problems, and an object of the present invention is to provide a technology enhancing efficiency of object recognition.

Solution to Problem

An information processing apparatus according to the present invention includes: 1) a detection unit detecting an object from each of a plurality of captured images generated by an image capture apparatus; and 2) a determination unit determining, for each detected object, an appropriate image being a captured image suitable for feature extraction of the object from among a plurality of captured images in which the object is detected.

A control method according to the present invention is executed by a computer. The control method includes: 1) a detection step of detecting an object from each of a plurality of captured images generated by an image capture apparatus; and 2) a determination step of determining, for each detected object, an appropriate image being a captured image suitable for feature extraction of the object from among a plurality of captured images in which the object is detected.

A program according to the present invention causes a computer to execute each step included in the control method according to the present invention.

Advantageous Effects of Invention

The present invention provides a technology enhancing efficiency of object recognition.

DESCRIPTION OF EMBODIMENTS

Example embodiments of the present invention will be described below by using drawings. Note that, in every drawing, similar components are given similar signs, and description thereof is not repeated as appropriate. Further, in each block diagram, each block represents a function-based configuration rather than a hardware-based configuration unless otherwise described.

First Example Embodiment

<Outline>

Figure 1:
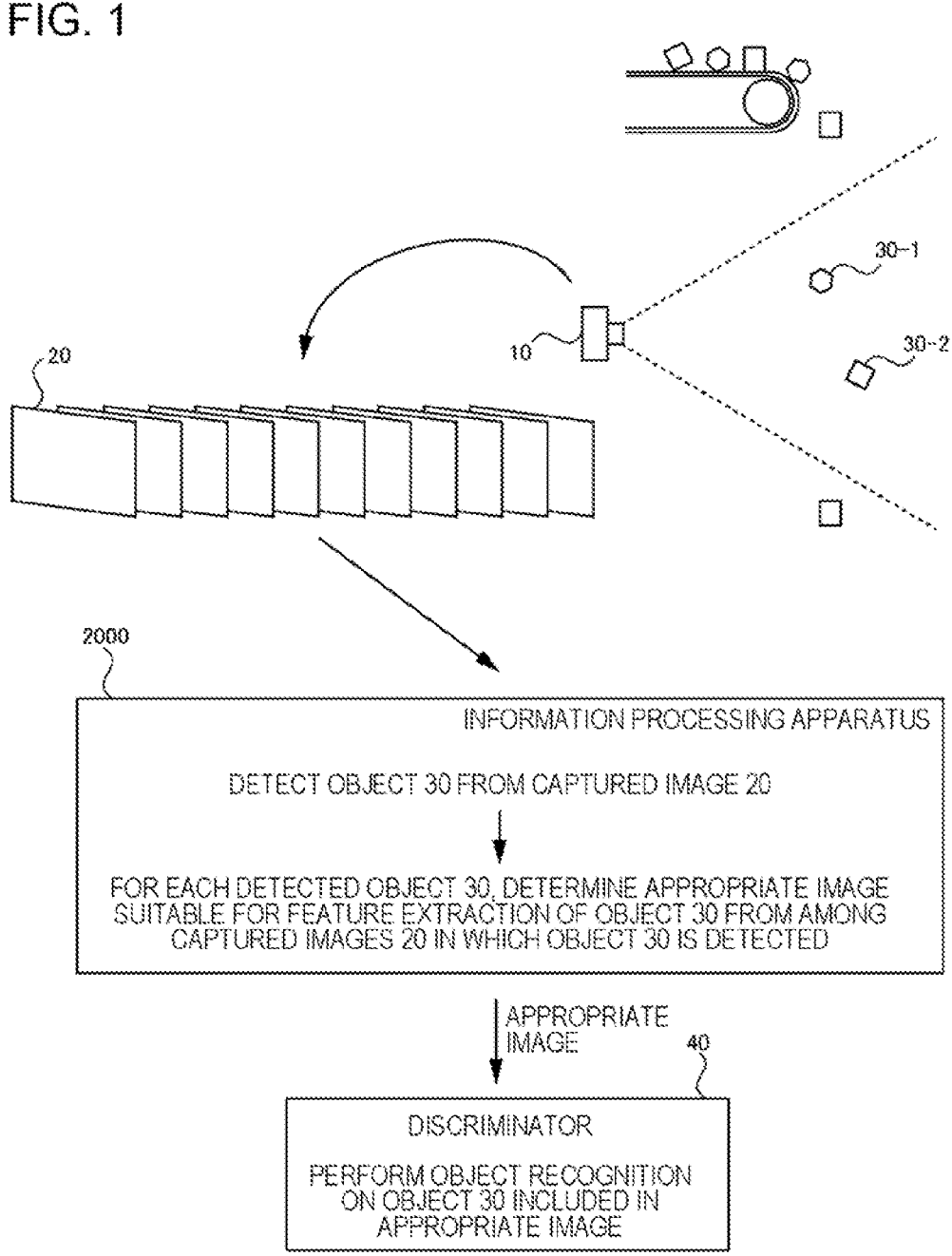
FIG. 1 is a diagram conceptually illustrating an operation of an information processing apparatus according to the present example embodiment.

FIG. 1 is a diagram conceptually illustrating an operation of an information processing apparatus 2000 according to the present example embodiment. Note that FIG. 1 is an illustration for ease of understanding the information processing apparatus 2000, and functions of the information processing apparatus 2000 are not limited to those described in FIG. 1.

An image capture apparatus 10 captures an image and consequently generates a captured image 20. For example, FIG. 1 illustrates a scene in which an object 30 transported by a conveyor is caused to free-fall and an image of the falling object 30 is captured by the image capture apparatus 10.

The information processing apparatus 2000 detects one or more objects 30 included in a captured image 20 by analyzing the captured image 20. The captured image 20 in which an object 30 is detected is used for recognition of the object 30. Examples of recognition of an object 30 include processing of determining the object 30 (such as authentication) and processing of determining a type to which the object 30 belongs from among a plurality of classes (types) (classification). For example, object recognition is performed by a discriminator 40 in FIG. 1.

Recognition of an object 30 is performed by using a feature value of the object 30 extracted from a captured image 20. However, even when an object 30 is detected from a captured image 20, the captured image 20 may not be suitable for feature extraction (extraction of a feature value) of the object 30. For example, when an object 30 is blurred or part of an object 30 is missing in a captured image 20, the captured image 20 is considered not so suitable for feature extraction of the object 30.

Figure 2:
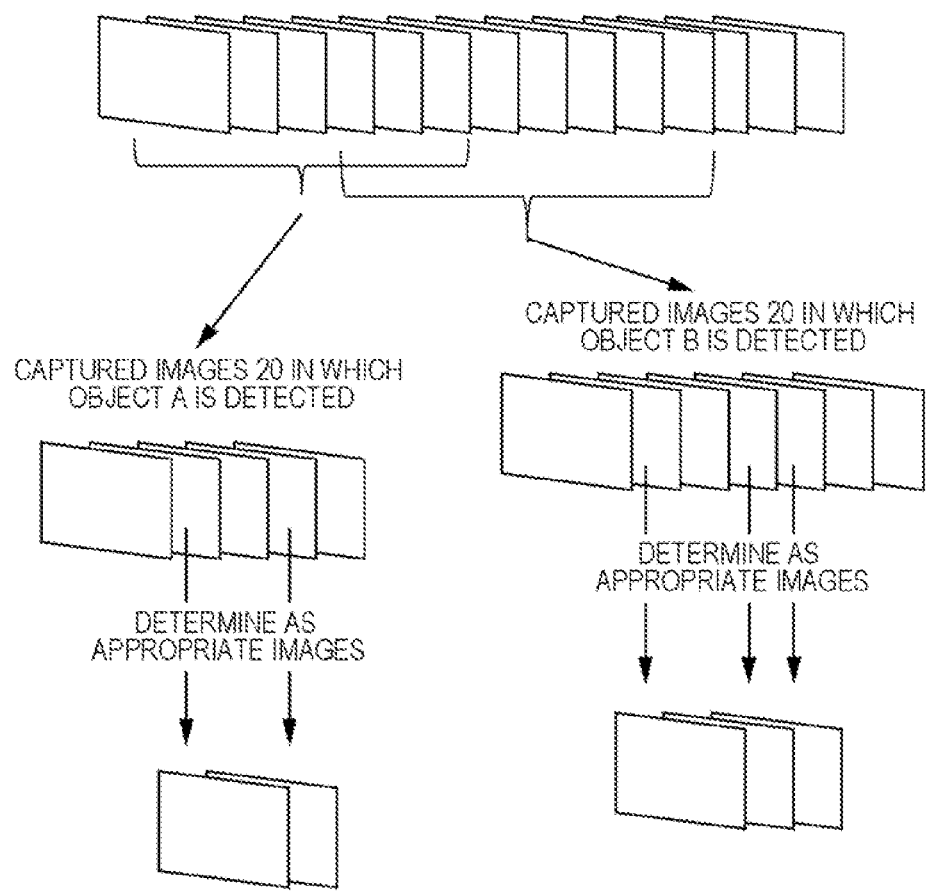
FIG. 2 is a diagram illustrating a scene in which an appropriate image is determined for each object.

Then, for each detected object 30, the information processing apparatus 2000 determines an image suitable for feature extraction of the object 30 (hereinafter referred to as an appropriate image) from among a plurality of captured images 20 in which the object 30 is detected. FIG. 2 is a diagram illustrating a scene in which an appropriate image is determined for each object 30. In FIG. 2, the information processing apparatus 2000 determines two appropriate images related to an object A from among five captured images 20 in which the object A is detected. Further, the information processing apparatus 2000 determines three appropriate images related to an object B from among seven captured images 20 in which the object B is detected.

Advantageous Effect

A method of extracting a feature value of an object 30 from every captured image 20 in which the object 30 is detected and performing recognition by using all the captured images 20 may be considered as a method of performing recognition of the object 30. However, there is a problem that, as the number of classes to which objects 30 are classified increases, the time required for feature extraction becomes longer and computer resources required for feature extraction increase. The problem becomes particularly remarkable when the image capture apparatus 10 repeatedly generates captured images 20 at a high frequency (high frame rate).

Then, for each object 30 detected from a captured image 20, the information processing apparatus 2000 according to the present example embodiment determines an appropriate image suitable for feature extraction of the object 30. Thus, captured images 20 used for recognition of the object 30 can be narrowed down to a captured image 20 suitable for feature extraction. Therefore, the time and computer resources required for object recognition using captured images 20 can be reduced, and efficiency enhancement of object recognition can be achieved.

The information processing apparatus 2000 can be utilized for providing various systems including object recognition processing. For example, the information processing apparatus 2000 can be utilized for construction of a system recognizing a moving object without stopping the object. Specific application examples include providing a system performing assortment of objects. For example, at a factory, products and parts are transported while being put on a conveyor and being dropped from above. Then, during the transportation, the products and the like may be assorted by type, or defective items and normal items may be assorted. Such assortment is performed not only at a factory but also at a distribution warehouse and the like.

When identification of articles takes time in such assortment work, the assortment work slows down. Then, by using the information processing apparatus 2000, an appropriate image is determined from among captured images 20 acquired by capturing images of an in-transit product or the like by the image capture apparatus 10, and object recognition is performed only on the determined appropriate image. Thus, the time required for object recognition can be reduced, and therefore high-speed assortment work can be achieved.

Other application examples include providing a system detecting foreign substances in liquid and powder. Under the current conditions, a container (such a bottle) in which medicine is enclosed is shaken and a foreign substance is detected by visual observation in foreign substance inspection of a medicine vital bottle. However, foreign substance detection by visual observation has problems such as a heavy workload of an operator. Then, it is preferable to perform foreign substance detection by capturing an image of liquid or powder when the liquid or the powder is put into a container and performing object recognition on the acquired captured image. By also limiting captured images used for object recognition by using the information processing apparatus 2000 in the system, the time required for object recognition can be reduced, and high-speed foreign substance detection can be achieved.

Further, when a camera with a high frame rate such as 1000 fps (hereinafter referred to as a high-speed camera) is used in the aforementioned assortment system or foreign substance detection system, an amount of movement or the like of an object between frames decreases, and therefore captured images more effective for object recognition are likely to be acquired compared with a case of using a low-frame-rate camera. Therefore, precision of object recognition can be increased.

However, when object recognition is performed with every one of a large number of captured images acquired from the high-speed camera as targets, processing of object recognition becomes a bottleneck. Then, it is preferable to, by using the information processing apparatus 2000, select captured images suitable for feature extraction from among the large number of captured images acquired by the high-speed camera and perform object recognition on the selected captured images. Thus, a highly-precise and high-speed system can be provided.

As a system requiring such highly-precise and high-speed processing, a system achieving iris authentication on a moving person is considered. In iris authentication using a common camera with a frame rate such as 30 fps, in order to perform authentication with sufficient precision, a person being an authentication target needs to be stopped and an image of the iris of the person standing still needs to be captured. Therefore, there are problems such as occurrence of a traffic jam at an authentication location.

On the other hand, capturing an image of a person being an authentication target by using a high-speed camera enables acquisition of a captured image allowing highly precise authentication even when the person is moving. Further, as described above, use of the information processing apparatus 2000 can avoid authentication processing becoming a bottleneck. Accordingly, highly-precise and high-speed iris authentication can be achieved for a moving person.

In addition, the information processing apparatus 2000 can be used for provision of highly-precise and high-speed systems achieving metal detection and assortment for urban mine reuse, vehicle authentication at a drive-through tollbooth, authentication of a drone in the air, a tire state check of a traveling vehicle, and the like. The information processing apparatus 2000 can also be used for achievement of highly-precise and high-speed real-time analysis of movement of a person and/or a robot.

The present example embodiment will be described in more detail below.

<Example of Functional Configuration>

Figure 3:
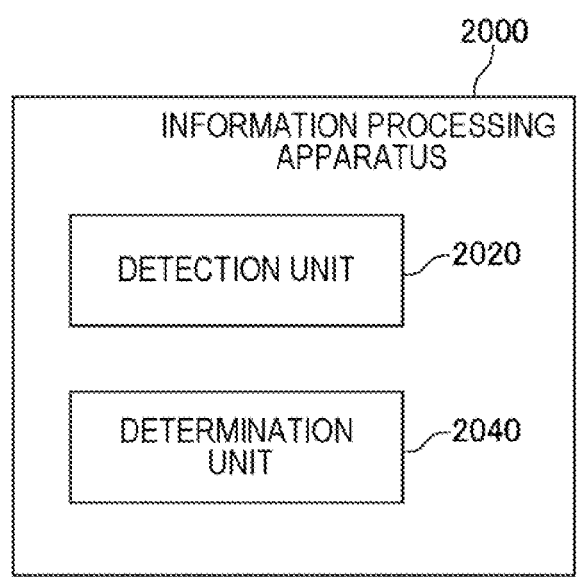
FIG. 3 is a block diagram illustrating a functional configuration of the information processing apparatus.

FIG. 3 is a block diagram illustrating a functional configuration of the information processing apparatus 2000. The information processing apparatus 2000 includes a detection unit 2020 and a determination unit 2040. The detection unit 2020 detects an object 30 from each of a plurality of captured images 20 generated by the image capture apparatus 10. For each detected object 30, the determination unit 2040 determines an appropriate image suitable for feature extraction of the object 30 from among a plurality of captured images 20 in which the object 30 is detected.

<Example of Hardware Configuration of Information Processing Apparatus 2000>

Each functional component in the information processing apparatus 2000 may be provided by hardware (such as a hardwired electronic circuit) providing each functional component or may be provided by a combination of hardware and software (such as a combination of an electronic circuit and a program controlling the circuit). The case of each functional component in the information processing apparatus 2000 being provided by a combination of hardware and software will be further described below.

Figure 4:
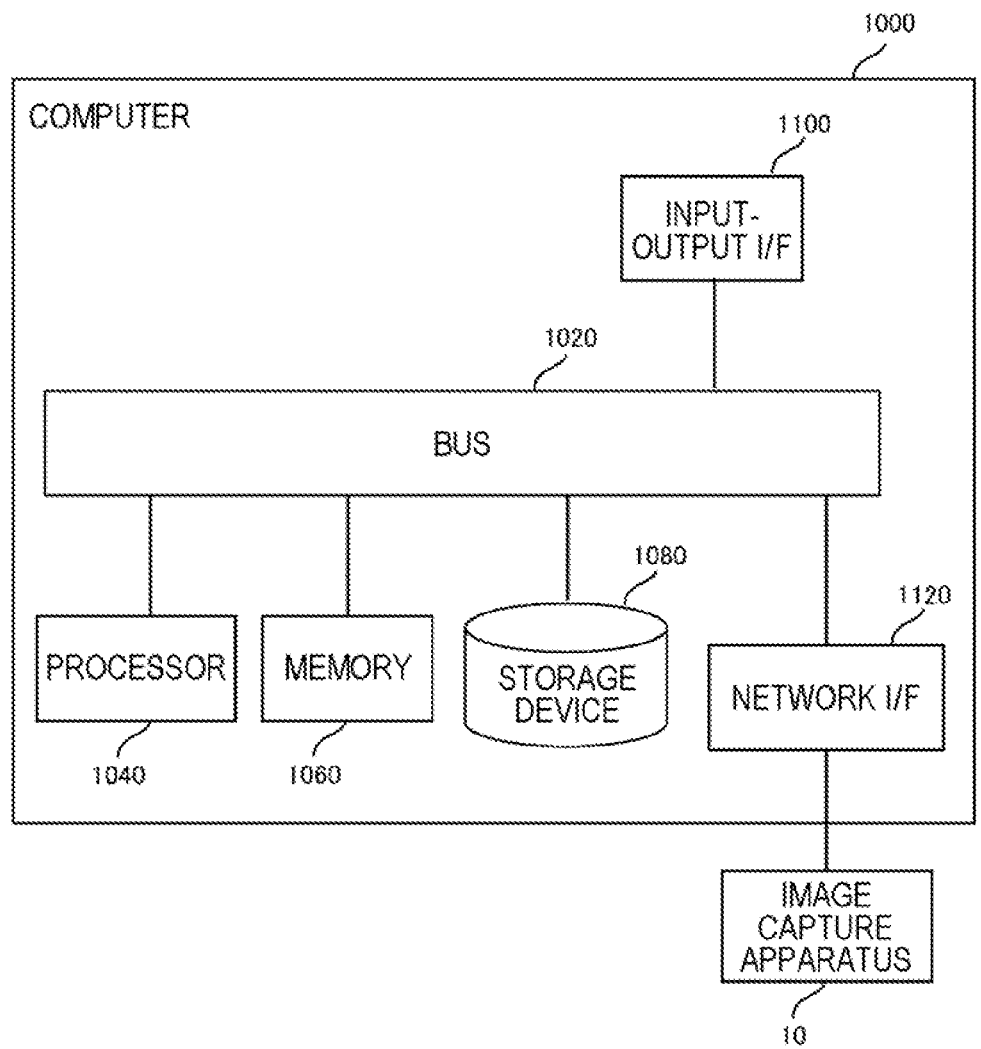
FIG. 4 is a diagram illustrating a computer for providing the information processing apparatus.

FIG. 4 is a diagram illustrating a computer 1000 for providing the information processing apparatus 2000. The computer 1000 is any computer. For example, the computer is a stationary-type computer such as a personal computer (PC) or a server machine. In addition, for example, the computer 1000 is a portable computer such as a smartphone or a tablet terminal. In addition, for example, the computer 1000 may be the image capture apparatus 10. In this case, the image capture apparatus 10 determines an image suitable for feature extraction of an object 30 from among captured images 20 generated by the image capture apparatus 10. For example, such an image capture apparatus 10 having the function of the information processing apparatus 2000 is provided by a camera referred to as an intelligent camera, a network camera, or an Internet Protocol (IP) camera. Note that the computer 1000 may be a dedicated computer designed for providing the information processing apparatus 2000 or may be a general-purpose computer.

The computer 1000 includes a bus 1020, a processor 1040, a memory 1060, a storage device 1080, an input-output interface 1100, and a network interface 1120. The bus 1020 is a data transmission channel for the processor 1040, the memory 1060, the storage device 1080, the input-output interface 1100, and the network interface 1120 to transmit and receive data to and from one another. Note that the method of interconnecting the processor 1040 and other components is not limited to a bus connection.

Examples of the processor 1040 include various processors such as a central processing unit (CPU), a graphics processing unit (GPU), and a field-programmable gate array (FPGA). The memory 1060 is a main storage provided by using a random access memory (RAM) or the like. The storage device 1080 is an auxiliary storage provided by using a hard disk, a solid state drive (SSD), a memory card, a read only memory (ROM), or the like.

The input-output interface 1100 is an interface for connecting the computer 1000 to an input-output device. For example, the input-output interface 1100 is connected to an input apparatus such as a keyboard and an output apparatus such as a display apparatus. In addition, for example, the input-output interface 1100 is connected to the image capture apparatus 10.

The network interface 1120 is an interface for connecting the computer 1000 to a communication network. Examples of the communication network include a local area network (LAN) and a wide area network (WAN). The method of connecting the network interface 1120 to the communication network may be a wireless connection or a wired connection.

The storage device 1080 stores a program module providing each functional component in the information processing apparatus 2000. The processor 1040 provides a function related to each program module by reading the program module into the memory 1060 and executing the program module.

<Image Capture Apparatus 10>

The image capture apparatus 10 is any apparatus capturing an image and consequently generating a captured image. The image capture apparatus 10 may be a still camera generating a still image or may be a video camera generating a video image. Further, without being limited to a visible light camera, any apparatus generating data that can be handled as image data, based on a detection result of a sensor, can be used as the image capture apparatus 10. For example, the image capture apparatus 10 may be a monochrome camera capturing an image of single-wavelength light or a camera capturing an image of infrared light or an electromagnetic wave in another wavelength range (including a terahertz wave or a millimeter wave).

It is preferable to properly set the frame rate of the image capture apparatus 10, based on the size, the moving velocity, and the like of an object 30 being an image capture target. For example, the frame rate is set in such a way that the maximum amount of movement of an object in one frame is sufficiently small compared with the size of the object 30 (such as equal to or less than half). With such a setting, even when two or more objects 30 simultaneously exist, each individual can be continuously identified without detailed recognition. Specifically, a preferable setting example of the image capture apparatus 10 in a case of capturing an image of an object 30 about 10 mm in diameter free-falling from a height of about 30 cm is a frame rate of fps.

For example, a frame rate to be set to the image capture apparatus 10 can be formulized by Equation (1) below.

Math. 1

$$\text{Frame rate: } f \geq \frac{2y}{x} \quad (1)$$

$$\left(\text{Image Capture Interval: } \frac{1}{f} \leq \frac{x}{2y}\right)$$

Note that an assumed size and an assumed moving velocity of the object 30 are denoted by x [mm] and y [mm/sec], respectively. Further, the frame rate of the image capture apparatus 10 is denoted by f [frames/sec].

The information processing apparatus 2000 may have a function of setting a frame rate to the image capture apparatus 10, based on aforementioned Equation (1) and the like. For example, the information processing apparatus 2000 acquires information representing an assumed size and an assumed moving velocity of the object 30 and computes a frame rate f, based on the information and aforementioned Equation (1). Then, the information processing apparatus 2000 sets the frame rate of the image capture apparatus 10 to computed f or a value acquired by adding a predetermined margin to f. Further, it is assumed that the image capture apparatus 10 is specified to set the frame rate thereof from among a plurality of candidates. In this case, for example, the information processing apparatus 2000 sets a minimum frame rate greater than aforementioned computed f to the image capture apparatus 10 out of frame rates being settable candidates.

Further, the information processing apparatus 2000 may compute a size and a velocity for each object 30 detected by using a captured image 20, instead of acquiring information indicating an assumed size and an assumed moving velocity of the object 30, and may compute the aforementioned frame rate f by using statistics (a maximum value or a mean value) of the computed size and the computed velocity as aforementioned x and y.

Note that an image capture interval may be set instead of setting a frame rate. The image capture interval is the reciprocal of the frame rate f.

A plurality of image capture apparatuses 10 may be provided. In this case, the information processing apparatus 2000 acquires captured images 20 from each of the plurality of image capture apparatuses 10.

<Flow of Processing>

Figure 5:
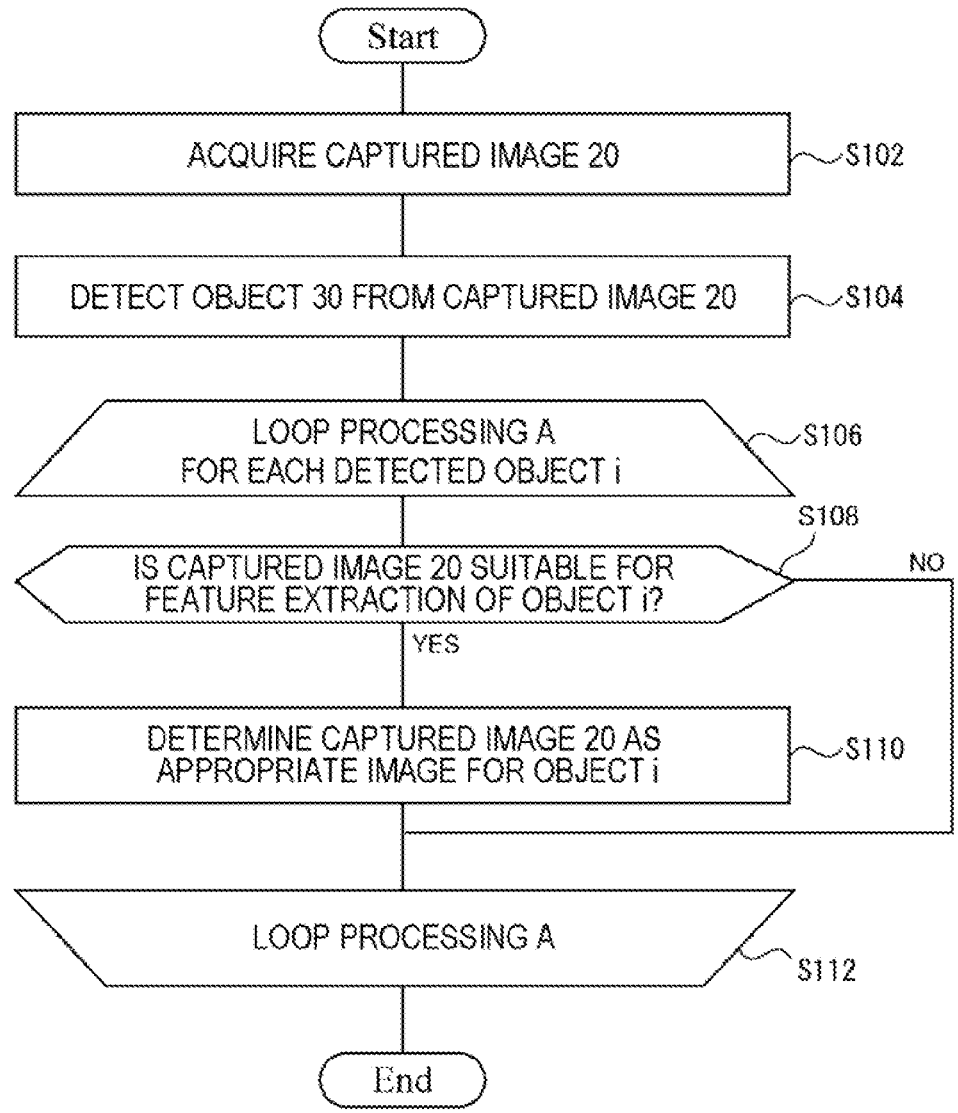
FIG. 5 is a flowchart illustrating a flow of processing executed by the information processing apparatus according to the first example embodiment.

FIG. 5 is a flowchart illustrating a flow of processing executed by the information processing apparatus 2000 according to the first example embodiment. The detection unit 2020 acquires a captured image 20 (S102). The detection unit 2020 detects an object 30 from the captured image 20 (S104).

S106 to S112 form loop processing A executed for each of one or more objects 30 detected from the captured image 20. In S106, the information processing apparatus 2000 determines whether the loop processing A has been executed for every object 30. When the loop processing A has been already executed for every object 30, the processing in FIG. 5 ends. On the other hand, when an object 30 not being a target of the loop processing A exists, the processing in FIG. 5 advances to S108. At this time, the information processing apparatus 2000 selects one object 30 from among objects 30 not yet being targets of the loop processing A. The object 30 selected here is denoted by an object i.

The determination unit 2040 determines whether the captured image 20 is suitable for feature extraction of the object i (S108). When the captured image 20 is suitable for feature extraction of the object i (S108: YES), the determination unit 2040 determines the captured image 20 as an appropriate image of the object i (S110). When the captured image 20 is not suitable for feature extraction of the object i (S108: NO), the processing in FIG. 5 advances to S112. Since S112 is the end of the loop processing A, the processing in FIG. 5 advances to S106.

For each captured image 20 generated by the image capture apparatus 10, the information processing apparatus 2000 executes a series of processing operations illustrated in FIG. 5. However, the flow of processing executed by the information processing apparatus 2000 is not limited to the flow illustrated in FIG. 5. For example, the information processing apparatus 2000 may determine an image most suitable for feature extraction of the object i from among a plurality of captured images 20 in which the object i is detected and may determine the image as an appropriate image for the object i. In this case, by comparing a plurality of captured images 20 in which the object i is detected, the information processing apparatus 2000 determines an appropriate image from among the captured images 20 (unillustrated), instead of determining, for each captured image 20, whether the captured image 20 is an appropriate image as illustrated in FIG. 5.

<Acquisition of Captured Image 20: S102>

The detection unit 2020 acquires a captured image 20 (S102). There are various methods by which the detection unit 2020 acquires a captured image 20. For example, the detection unit 2020 acquires a captured image 20 by receiving the captured image 20 transmitted from the image capture apparatus 10. In addition, for example, the detection unit 2020 accesses the image capture apparatus 10 and acquires a captured image 20 stored in the image capture apparatus 10.

Note that the image capture apparatus 10 may cause a storage apparatus provided outside the image capture apparatus 10 to store a captured image 20. In this case, the detection unit 2020 accesses the storage apparatus and acquires a captured image 20.

When the function of the information processing apparatus 2000 is provided by the image capture apparatus 10, the detection unit 2020 acquires a captured image 20 generated inside the information processing apparatus 2000. In this case, for example, the captured image is stored in a storage apparatus (such as the storage device 1080) inside the information processing apparatus 2000.

The detection unit 2020 may acquire a captured image 20 at any timing. For example, every time a new captured image 20 is generated by the image capture apparatus 10, the detection unit 2020 acquires the newly generated captured image 20. In addition, for example, the detection unit 2020 may periodically acquire an unacquired captured image 20. At this time, the detection unit 2020 may only acquire a latest captured image 20 or may acquire a plurality of (for example, all) captured images 20.

<Detection of Object 30: S104>

The detection unit 2020 detects an object 30 from a captured image 20 (S104). More specifically, the detection unit 2020 detects an image area representing an object 30 from a captured image 20. The image area is hereinafter referred to as an object area. For example, an object area is an image area with a predetermined shape (such as a circumscribed rectangle) including an object 30. The object area may also be expressed as a region of interest (ROI) area. Existing object detection processing (such as background subtraction) may be used as the processing of detecting an image area representing an object from a captured image.

Note that processing of detecting a new object 30 undetected in any captured image 20 in a case of processing time-series captured images 20 may be performed with only part of an image area in a captured image 20 as a target. For example, when the image capture apparatus captures an image of an object carried by a belt conveyor, an image area in a captured image where a new object appears is limited. Then, an image area where such a new object appears is predetermined, and the detection unit 2020 is caused to perform the processing of detecting a new object 30 with the image area as a target.

An existing technology such as tracking can be used as processing of detecting an existing object 30 from a captured image 20. For example, when detecting a new object 30 from a certain captured image 20, the detection unit 2020 computes a representative point (such as a barycenter position) and a size of the object 30 in the captured image 20 and sets an image area (hereinafter referred to as a search area) to be searched for the object 30 from the next captured image 20, based on the computed representative point and the computed size. Then, when acquiring the next captured image 20, the detection unit 2020 detects an existing object 30 by executing object detection processing on the search area in the captured image 20. At this time, by performing image capture at a sufficiently high frame rate relative to the size and the moving velocity of the object 30, the search area is limited to the neighborhood of the representative point of the object 30 in the current frame, and therefore each individual object 30 can be identified without recognizing a detailed feature.

Note that setting of a search area may be performed in further consideration of the moving direction and the moving velocity of an object 30. For example, when an object 30 is moving on a conveyor, the direction in which the conveyor moves the object and the moving velocity of the object are known. Further, even when the moving velocity and the moving direction are not known, the moving velocity and the moving direction can be computed based on a change in the position of the object 30 detected from a plurality of captured images.

The size of a search area may be preset to a fixed value or may be determined based on the size of an object 30 detected from a captured image 20. For example, in the latter case, the size of a search area is set to a constant multiple of the size of an object 30 detected from a captured image 20. When image capture is particularly performed at a sufficiently high frame rate such as 1000 fps, an object position hardly changes between frames, and therefore the size of a search area can be set almost as small as the size of an object 30 detected in a captured image 20. Therefore, robustness against approach between objects 30 can be enhanced. Further, image capture at a high frame rate in which an object position hardly changes between frames also has an advantage of being robust to an unexpected movement of an object.

<Determination of Appropriate Image: S108, S110>

The determination unit 2040 determines an appropriate image suitable for feature extraction of an object 30 from among captured images 20 in which the object 30 is detected (S108, S110). To do so, for each captured image 20 in which the object 30 is detected, the determination unit 2040 computes an indicator value representing the degree of suitability of an object area of the object 30 for feature extraction, the object area being included in the captured image 20. The indicator value is hereinafter referred to as a degree of appropriateness. A degree of appropriateness is computed for each combination of "a captured image 20 and an object 30 detected from the captured image 20."

For example, out of a plurality of captured images 20 in which a certain object 30 is detected, the determination unit 2040 determines a captured image 20 maximizing the degree of appropriateness computed for an object area of the object 30 as an appropriate image for the object 30. In addition, for example, out of a plurality of captured images 20 in which a certain object 30 is detected, the determination unit 2040 determines each captured image 20 a degree of appropriateness of which computed for the object 30 is equal to or greater than a predetermined threshold value as an appropriate image for the object 30.

Any value can be set to the aforementioned predetermined threshold value. For example, the threshold value is set based on a quantity of computer resources prepared in a discriminator performing object recognition by using an appropriate image. Specifically, the number of appropriate images is decreased by increasing the threshold value as the quantity of computer resources decreases.

In addition, for example, the aforementioned threshold value is determined based on a score of the discriminator 40. As the aforementioned threshold value increases, only a captured image 20 more suitable for feature extraction is determined as an appropriate image, and therefore precision of the discriminator 40 increases. In other words, as the aforementioned threshold value increases, a score (likelihood) output by the discriminator 40 with respect to a correct answer class is likely to increase when a determined appropriate image is input to the discriminator 40. Then, an operation of "causing the determination unit 2040 to determine an appropriate image with respect to test data (a plurality of captured images 20) prepared for threshold value setting and causing the discriminator 40 to perform object recognition on the determined appropriate image" is repeated while gradually increasing the aforementioned threshold value used for determination of an appropriate image. The operation is repeated until a statistic (such as a mean value) of a score related to the correct answer class output from the discriminator 40 becomes equal to or greater than a predetermined value. Then, the aforementioned threshold value being set when the mean value of the score becomes equal to or greater than the predetermined value is used as a threshold value finally set to the determination unit 2040.

Note that a value for recognizing variation of a score (such as a variance or a standard deviation) may be further used as a statistic of the score. In this case, for example, a threshold value satisfying a condition such as "the mean value of scores related to a correct answer class output from the discriminator 40 is equal to or greater than a first predetermined value, and the variance of the scores is equal to or less than a second predetermined value" is used.

Note that the threshold values determined by the aforementioned various methods are previously stored in a storage apparatus accessible from the determination unit 2040.

<<Computation Method of Degree of Appropriateness>>

Various indicators can be used for computation of a degree of appropriateness. Indicators usable for computation of a degree of appropriateness will be specifically described below.

<<<Indicator Value Acquired from One Captured Image 20>>>

For example, an indicator value related to an amount of blurring in an object area, an indicator value related to variation of pixel values in an object area, an information loss state (such as overexposed white and black crushing) in an object area, or an indicator value representing properness of the direction of an object 30 can be used as an indicator value acquired from one captured image 20.

An S/N ratio, an indicator value representing contrast, or the like can be used as an indicator value representing an amount of blurring in an object area. For example, Michelson contrast, Weber contrast, or a contrast ratio can be used as an indicator value representing contrast. The indicator values are defined by the following equations, respectively.

Math. 2

$$\text{Michelson contrast:} \frac{I_{max} - I_{min}}{I_{max} + I_{min}} \quad (2)$$

$$\text{Weber contrast:} \frac{I_{max} - I_{min}}{I_{min}} \quad (3)$$

$$\text{Contrast ratio:} \frac{I_{max}}{I_{min} + 1} \quad (4)$$

Note that Imax and Imin denote the maximum value and the minimum value of brightness included in an object area, respectively.

An indicator value related to variation of pixel values can be represented by the variance of brightness values or the entropy. The indicator values are expressed by the following equations, respectively.

Math. 3

$$\text{Variance of brightness values:} \frac{1}{N} \sum_k (I_k - I_{avg})^2 \quad (5)$$

$$\text{Entropy:} -\sum_j \frac{N_j}{N} * \log_2 \frac{N_j}{N} \quad (6)$$

Note that Ik denotes the brightness value of a pixel k included in an object area. Iavg denotes the mean of brightness values of all pixels included in the object area. N denotes the total number of pixels included in the object area. Nj denotes the total number of pixels with a gradation j.

For example, an indicator value representing an information loss state is expressed by the number of pixels in which overexposed white is occurring or the number of pixels in which black crushing is occurring. The pixel in which overexposed white is occurring refers to the total number of pixels with a brightness value at the upper limit (for example, 255 when the brightness is represented by a value equal to or greater than 0 and equal to or less than 255) of the sensor sensitivity of the image capture apparatus 10 out of pixels included in an object area. The pixel in which black crushing is occurring refers to the total number of pixels with a brightness value at the lower limit (for example, 0 when the brightness is represented by a value equal to or greater than 0 and equal to or less than 255) of the sensor sensitivity of the image capture apparatus 10 out of the pixels included in the object area.

An indicator value representing properness of the direction of an object 30 refers to a value representing the degree of a part well representing a feature of the object 30 facing the image capture apparatus 10. In order to extract a feature of an object 30 from a captured image with high precision, it is preferable that a part well representing a feature of the object 30 be included in the captured image 20. For example, when an object 30 is a person, it is preferable that the front side of the face including various parts such as the eye, the nose, and the mouth face toward the image capture apparatus 10 (the entire front side of the face be included in the captured image 20).

Then, for example, a computation method of an indicator value representing properness of the direction of the object 30 is determined according to the type of the object 30. For example, properness of the direction of the object 30 is determined based on the number of parts included in the captured image 20 (an object area of the object 30) out of parts of the object 30 to be included in a captured image 20 when an image of the object 30 is captured in a proper direction. Specifically, properness of the direction of the object 30 can be determined by "the number of parts included in the object area/the number of parts to be included in the object area." Note that each part may be weighted differently.

In addition, for example, an indicator value representing properness of the direction of an object 30 may be determined based on the position of each part in an object area. For example, an indicator value representing the degree of frontality of the face of a person (the degree of the face facing the front side) is used. For example, the degree of frontality of the face in a horizontal direction can be determined as "the degree of closeness of the horizontal position of the nose to the center between both eyes in the face area." Specifically, as the position of the nose in the horizontal direction gets closer to the center between both eyes, the degree of frontality in the horizontal direction is increased. On the other hand, for example, the degree of frontality of the face in a vertical direction can be determined as "the degree of closeness of the positions of both eyes to the center position of the face in the vertical direction." For example, the face area is divided into three areas in the vertical direction being 1) upper ⅓ part of the face, 2) a part between ⅓ and ½ from the top of the face, and 3) a part below the upper ½ of the face. Then, when both eyes are included in the area 1), the face is determined to be facing upward, when both eyes are included in the area 2), the face is determined to be facing front, and when both eyes are included in the area 3), the face is determined to be facing downward. For example, the degree of frontality of the face in the vertical direction is determined to take a maximum value in a case of facing front. For example, a fixed value is set to the indicator value for each case of 1) to 3) described above. Note that, for example, a Haar-like feature can be used for position detection of both eyes and the nose.

Note that an indicator value representing an information loss state is considered more suitable for feature extraction as the value decreases. Then, when an indicator value representing an information loss state is used as a degree of appropriateness, it is preferable to indicate that a greater degree of appropriateness is more suitable for feature extraction, by using the reciprocal or the like of the indicator value as the degree of appropriateness.

<<<Indicator Value Acquired by Comparison of a Plurality of Captured Images 20>>>

An indicator value such as the moving velocity, the rotation velocity, or the degree of deformation of an object 30 may also be handled as a degree of appropriateness. Specifically, a captured image 20 with a smaller moving velocity, rotation velocity, and degree of deformation of an object 30 is considered more suitable for feature extraction of the object 30.

The moving velocity, the rotation velocity, or the degree of deformation of an object 30 in a captured image 20 can be computed based on the difference between object areas of the object 30 in the captured image 20 and another captured image 20 (such as a preceding or immediately succeeding captured image 20 in a time series). Note that an existing technology can be used as a technology of computing the moving velocity, the rotation velocity, and the degree of deformation of an object detected from an image, based on the difference between images. Note that when image capture is performed at a high frame rate, movement of an object 30 can be assumed to be almost linear. Therefore, a degree of deformation and an amount of rotation can be computed with high precision by a technique such as the Lucus-Kanade method.

As described above, a smaller value of each of the moving velocity, the rotation velocity, and the degree of deformation of an object 30 represents higher suitability for feature extraction of the object 30. Then, when each value is used as a degree of appropriateness, it is preferable to indicate that suitability for feature extraction increases as a degree of appropriateness increases, by using the reciprocal or the like of the value as a degree of appropriateness.

<<<Degree of Appropriateness Determined by Control Information of Image Capture Apparatus 10>>>

Examples of control information of the image capture apparatus 10 include control parameters such as a focus value and pan-tilt angles. It is assumed here that the image capture apparatus 10 has a function of automatically adjusting the focus (autofocus) or automatically adjusting pan-tilt angles (auto pan-tilt). In this case, control information indicating a value of a control parameter such as a focus value or pan-tilt angles at a time point when each captured image 20 is generated can be acquired. Further, an automatic adjustment function such as autofocus or auto pan-tilt is performed with attention focused on a specific object included in an image capture range of the image capture apparatus 10. Then, information representing an object being a target of such an automatic function (such as information representing the position of the object in a captured image 20) can also be handled as control information of the image capture apparatus 10. Note that an existing technology can be used as a technology of acquiring the aforementioned control information. For example, control information can be acquired from an actuator or a sensor provided on the image capture apparatus 10 or a supporting member (such as a pan head) thereof.

A method of determining a degree of appropriateness, based on the control information will be described below. For example, when a focus value or pan-tilt values rapidly change (for example, exponentially increase or decrease), or before or after the change, a large change occurs in movement such as the velocity and/or the direction of an object, and it is considered that the image capture apparatus 10 cannot fully follow the movement of the object (the control parameter of the image capture apparatus 10 is not set to a proper value). Therefore, it is highly probable that a motion blur or out-of-focus blur of an object 30 is large and feature extraction of the object 30 with high precision is difficult, in a captured image 20 generated at a rapid change of the focus value or the pan-tilt values or before or after the change. On the other hand, when the focus value or the pan-tilt values change stably (for example, change linearly) or before or after the change, a change in movement of the object is small, and it is considered that the image capture apparatus 10 can follow the movement of the object (the control parameter of the image capture apparatus 10 is set to a proper value). Therefore, it is highly probable that a motion blur or out-of-focus blur of the object 30 is small and feature extraction of the object 30 can be performed with high precision, in a captured image 20 generated at a stable change of the focus value or the pan-tilt values or before or after the change.

Then, for example, the determination unit 2040 determines a time point when a control parameter of the image capture apparatus 10 rapidly changes and sets a smaller value to the degree of appropriateness of a captured image 20 generated at a time point closer to the time point. Whether a control parameter of the image capture apparatus 10 rapidly changes can be determined by, for example, determining whether the rate of change of the rate of change of the control parameter over time over time (the second derivative value of a function representing the change of the control parameter) is equal to or greater than a predetermined threshold value.

Further, it is highly probable that an object being a target of an automatic adjustment function such as autofocus or auto pan-tilt (an object being a tracking target) is included in a captured image 20 without a motion blur or out-of-focus blur compared with another object. Then, the determination unit 2040 acquires control information representing an object 30 being the target of the automatic adjustment function (such as information representing the position of the object 30 in the captured image 20). Then, the determination unit 2040 sets a greater value to the degree of appropriateness of the captured image 20 for the object 30 determined by the control information than the degree of appropriateness for the other object 30. For example, the determination unit 2040 computes the degree of appropriateness by the aforementioned various methods and then adjusts the degree of appropriateness of the captured image 20 for the object determined by the control information to a greater value by multiplying the degree of appropriateness by a predetermined value greater than 1.

<<Use of a Plurality of Indicator Values>>

The determination unit 2040 determines the degree of appropriateness of a captured image 20 by using one or more of the aforementioned various indicator values. When a plurality of indicator values are used, for example, the determination unit 2040 computes a weighted mean value of the computed indicator values and handles the weighted mean value as the degree of appropriateness.

A determination of indicator values used for computation of the degree of appropriateness and a determination of a weight to be given to each indicator value may be made manually or may be made by the information processing apparatus 2000. In the latter case, for example, the aforementioned determinations are made by machine learning using training data. Specifically, a discriminator having a function of "determining whether an input object area is suitable for feature extraction" or a discriminator having a function of "inputting a plurality of object areas related to a certain object 30 and determining an object area suitable for feature extraction from among the plurality of object areas" is provided in the determination unit 2040. The discriminator may be hereinafter also referred to as a discriminator 2042. For example, a linear support vector machine (SVM) can be used as a model of the discriminator 2042.

An object area and control information of the image capture apparatus 10 related to the object area (related to a captured image 20 including the object area) are input to the discriminator 2042. The discriminator 2042 computes the aforementioned indicator values by using the input information, computes the degree of appropriateness, based on the indicator values, and determines an appropriate image, based on the degree of appropriateness computed for each captured image 20.

<<<Learning of Discriminator 2042>>>

For example, training data representing a combination of "an object area of an object 30, control information of the image capture apparatus 10, and correct answer data" are used for learning of the discriminator 2042. Note that when a degree of appropriateness based on comparison between a plurality of object areas of a plurality of captured images 20 is used, training data include a plurality of object areas of the object 30. Correct answer data indicated by training data indicate the degree of suitability of an object area indicated by the training data for feature extraction of an object 30, that is, the degree of appropriateness.

Figure 6:
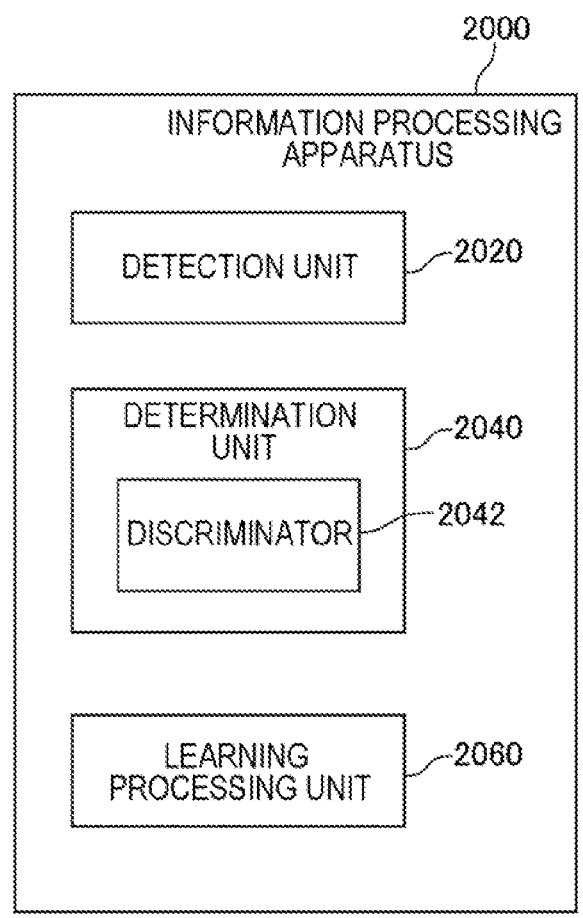
FIG. 6 is a diagram illustrating an information processing apparatus including a learning unit.

When learning of the discriminator 2042 is performed by the information processing apparatus 2000, the information processing apparatus 2000 further includes a functional component performing learning of a discriminator. The functional component is referred to as a learning processing unit 2060. FIG. 6 is a diagram illustrating the information processing apparatus 2000 including the learning processing unit 2060. The learning processing unit 2060 performs learning of a discriminator by using one or more pieces of training data.

An existing technology can be used as a technology of performing learning of a discriminator by using training data. For example, a loss is computed based on a degree of appropriateness output by inputting an object area of an object 30 indicated by training data to a discriminator, and correct answer data indicated by the training data; and a parameter of the discriminator (such as a weight attached to each indicator value) is updated in such a way as to decrease the loss. Note that in order to allow learning of the discriminator 2042, the discriminator 2042 is configured to, at learning, output the degree of appropriateness of an object area instead of a flag (label) representing whether the object area is suitable for feature extraction.

A value of correct answer data indicated by training data may be manually determined or may be determined by a computer. In the latter case, for example, correct answer data are determined based on a score acquired by performing object recognition by using an object area associated with the correct answer data in the training data.

In general, for each of a plurality of predetermined classes, the probability of an input image area representing an object belonging to the class is computed in a discriminator recognizing a class (type) of an object represented by a certain image area. Then, a class maximizing the computed probability is determined as a class of the object represented by the input image area.

When an object area of an object 30 is input to a discriminator, it can be said that the probability computed by the discriminator with respect to a correct answer class (a class to which the object 30 actually belongs) increases as the object area better represents a feature of the object 30. For example, when an image area representing a person A is input to a discriminator, the probability of the image area representing the person A is computed by the discriminator. Then, it can be said that as the probability increases, the input image area better represents a feature of the person A.

Then, the probability (score) output from the discriminator with respect to a correct answer class when an object area of an object 30 is input to the discriminator can be used as correct answer data (degree of appropriateness) associated with the object area of the object 30. For example, the discriminator 40 (see FIG. 1) performing object recognition by using an appropriate image output from the information processing apparatus 2000 can be used as the discriminator.

<Output of Appropriate Image>

For each object 30, the information processing apparatus 2000 outputs an appropriate image determined for the object 30. Specifically, the information processing apparatus 2000 outputs an appropriate image to the discriminator 40 performing object recognition by using the appropriate image. The discriminator 40 may be provided inside the information processing apparatus 2000 or may be provided outside the information processing apparatus 2000. Note that the information processing apparatus 2000 may output only an object area determined to be suitable for feature extraction (that is, part of a captured image 20) instead of outputting the entire appropriate image (that is, the entire captured image 20). In addition, for example, the information processing apparatus 2000 may output the position of an object area suitable for feature extraction, the area being included in an appropriate image, in addition to the entire appropriate image.

There are various timings at which the information processing apparatus 2000 outputs an appropriate image. For example, every time an appropriate image is determined, the information processing apparatus 2000 outputs the appropriate image to the discriminator 40. In addition, for example, the information processing apparatus 2000 outputs an appropriate image at predetermined time intervals. In this case, an appropriate image determined at or after a time point when the preceding appropriate image is output becomes an output target. In addition, for example, the information processing apparatus 2000 outputs an appropriate image at a timing when the discriminator 40 becomes operational (for example, at a timing when a free resource becomes available in computer resources for operating the discriminator 40). In this case, an appropriate image determined at or after a time point when the preceding appropriate image is output becomes an output target as well.

The information processing apparatus 2000 may output part of appropriate images of an output target instead of all appropriate images. For example, out of appropriate images being output targets, the information processing apparatus 2000 outputs a predetermined number (such as one) of the appropriate images. There are various methods of determining appropriate images to be output. For example, out of appropriate images being output targets, the information processing apparatus 2000 outputs appropriate images of a predetermined rank or higher in descending order of the degree of appropriateness. In this case, an appropriate image with a higher degree of appropriateness is output with a higher priority.

In addition, for example, out of appropriate images being output targets, the information processing apparatus 2000 outputs appropriate images of a predetermined rank or higher in descending order of a generation time point. In this case, an appropriate image with a later (in other words, newer) generation time point is output with a higher priority.

<Example of Specific Usage Scene>

Figure 7:
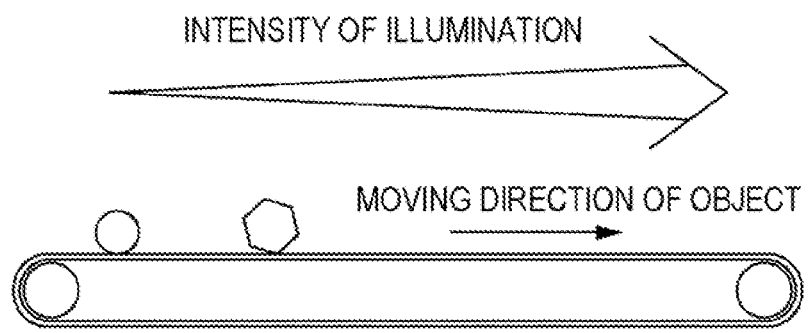
FIG. 7 is a diagram illustrating a specific usage scene of the information processing apparatus.

FIG. 7 is a diagram illustrating a specific usage scene of the information processing apparatus 2000. In this example, assortment of objects 30 moving on a conveyor is performed. Further, objects 30 moving on the conveyor are irradiated by illuminating light.

Proper brightness of illumination by which an object 30 is irradiated varies with the color of the object 30. For example, in order to recognize a feature of a black object 30, it is preferable to irradiate the object with strong light. On the other hand, when a white object 30 is irradiated by such strong light, a large amount of overexposed white occurs in an image area representing the white object 30 in a captured image 20, and recognition of a feature of the white object 30 from the captured image 20 becomes difficult.

When the color of every object 30 has the same degree of brightness, the intensity of illumination can be set to a fixed intensity suitable for the object 30. However, when the colors of objects 30 are diverse, it is difficult to thus set a fixed intensity to illumination.

Then, the intensity of light by which the conveyor is irradiated is varied with location in the example in FIG. 7. When objects 30 are moved on the conveyor in such an illumination environment, every object 30 is irradiated with light with an intensity suitable for the object 30 at one location or another.

Then, an image of an object 30 moving on the conveyor is captured by a plurality of image capture apparatuses 10 placed at positions different from one another, and captured images 20 acquired from the image capture apparatuses 10 are processed by the information processing apparatus 2000. Thus, for each object 30, a captured image 20 acquired by an image capture apparatus 10 capturing an image of a location irradiated by light with an intensity suitable for the object 30 is determined as an appropriate image for the object 30. Thus, a captured image 20 suitable for feature extraction of an object 30 with any color can be acquired, and therefore highly precise object recognition can be achieved.

While the example embodiments of the present invention have been described above with reference to the drawings, the drawings are exemplifications of the present invention, and combinations of the aforementioned example embodiments or various configurations other than those described above may be employed.

A part or the whole of the aforementioned example embodiments may also be described as the following supplementary notes but is not limited thereto.

1. An information processing apparatus including:
    a detection unit detecting an object from each of a plurality of captured images generated by an image capture apparatus; and
    a determination unit determining, for each detected object, an appropriate image being a captured image suitable for feature extraction of the object from among a plurality of captured images in which the object is detected.

2. The information processing apparatus according to 1., wherein
    the determination unit computes, for the each captured image in which the object is detected, a degree of appropriateness representing a degree of suitability for feature extraction of the object and determines the appropriate image for the object, based on the computed degree of appropriateness.

3. The information processing apparatus according to 2., wherein
    the determination unit computes the degree of appropriateness of the each captured image by using control information of the image capture apparatus at a time point when the captured image is generated.

4. The information processing apparatus according to 3., wherein
    the control information of the image capture apparatus includes any one or more of a focus value and pan-tilt angles.

5. The information processing apparatus according to any one of 2. to 4., wherein
    the plurality of captured images generated by the image capture apparatus are time-series captured images, and
    the determination unit computes the degree of appropriateness of the each captured image, based on a difference between the captured image and another captured image.

6. The information processing apparatus according to any one of 2. to 5., wherein
    the determination unit includes a discriminator determining whether the captured image is suitable for feature extraction of the object, the discriminator computes the degree of appropriateness as a weighted mean of one or more indicator values and makes the determination, based on the computed degree of appropriateness, and
    the indicator values used for computation of the degree of appropriateness include an indicator value computed based on control information of the image capture apparatus.

7. The information processing apparatus according to 6., further including
    a learning processing unit determining a weight for the each indicator value by performing learning processing of the discriminator.

8. The information processing apparatus according to any one of 2. to 7., wherein
    the determination unit determines the captured image maximizing the degree of appropriateness computed for the object as the appropriate image for the object.

9. The information processing apparatus according to any one of 2. to 7., wherein
    the determination unit determines the captured image the degree of appropriateness of which computed for the object is equal to or greater than a threshold value as the appropriate image for the object.

10. The information processing apparatus according to any one of 1. to 9., wherein,
    denoting a size and a moving velocity of an object being an image capture target by x and y, respectively, a time interval T in image capture by the image capture apparatus is equal to or less than $x/(2*y)$.

11. The information processing apparatus according to 10., wherein
    information indicating a size x and a moving velocity y of an object being an image capture target is acquired, the time interval T is determined by using the acquired information, and the determined time interval T is set to the image capture apparatus.

12. A control method executed by a computer, the control method including:
    a detection step of detecting an object from each of a plurality of captured images generated by an image capture apparatus; and
    a determination step of determining, for each detected object, an appropriate image being a captured image suitable for feature extraction of the object from among a plurality of captured images in which the object is detected.

13. The control method according to 12., wherein,
   in the determination step, for the each captured image in which the object is detected, a degree of appropriateness representing a degree of suitability for feature extraction of the object is computed, and the appropriate image for the object is determined based on the computed degree of appropriateness.
14. The control method according to 13., wherein,
   in the determination step, a degree of appropriateness of the each captured image is computed by using control information of the image capture apparatus at a time point when the captured image is generated.
15. The control method according to 14., wherein
   the control information of the image capture apparatus includes any one or more of a focus value and pan-tilt angles.
16. The control method according to any one of 13. to 15., wherein
   the plurality of captured images generated by the image capture apparatus are time-series captured images, and,
   in the determination step, a degree of appropriateness of the each captured image is computed based on a difference between the captured image and another captured image.
17. The control method according to any one of 13. to 16., wherein
   the computer includes a discriminator determining whether the captured image is suitable for feature extraction of the object,
   in the determination step, the discriminator computes the degree of appropriateness as a weighted mean of one or more indicator values and makes the determination, based on the computed degree of appropriateness, and
   the indicator values used for computation of the degree of appropriateness include an indicator value computed based on control information of the image capture apparatus.
18. The control method according to 17., further including
   a learning processing step of determining a weight for the each indicator value by performing learning processing of the discriminator.
19. The control method according to any one of 13. to 18., wherein,
   in the determination step, the captured image maximizing the degree of appropriateness computed for the object is determined as the appropriate image for the object.
20. The control method according to any one of 13. to 18., wherein,
   in the determination step, the captured image the degree of appropriateness of which computed for the object is equal to or greater than a threshold value is determined as the appropriate image for the object.
21. The control method according to any one of 12. to 20., wherein,
   denoting a size and a moving velocity of an object being an image capture target by x and y, respectively, a time interval T in image capture by the image capture apparatus is equal to or less than $x/(2*y)$.
22. The control method according to 21., further including
   acquiring information indicating a size x and a moving velocity y of an object being an image capture target, determining the time interval T by using the acquired information, and setting the determined time interval T to the image capture apparatus.
23. A program causing a computer to execute each step included in the control method according to any one of 12. to 22.

This application claims priority based on Japanese Patent Application No. 2019-005778 filed on Jan. 17, 2019, the disclosure of which is hereby incorporated by reference thereto in its entirety.

REFERENCE SIGNS LIST

10 Image capture apparatus
20 Captured image
30 Object
40 Discriminator
1000 Computer
1020 Bus
1040 Processor
1060 Memory
1080 Storage device
1100 Input-output interface
1120 Network interface
2000 Information processing apparatus
2020 Detection unit
2040 Determination unit
2042 Discriminator
2060 Learning processing unit

The invention claimed is:
1. An information processing apparatus comprising:
   one or more processors; and
   a memory storing program code executable by the one or more processors to:
      detect an object from each of a plurality of captured images generated by an image capture apparatus;
      compute, for each captured image in which the object is detected, a degree of appropriateness representing a degree of suitability for feature extraction of the object, as a weighted mean of one or more indicator values that include an indicator value computed based on control information of the image capture apparatus; and
      determine, for the detected object, an appropriate image suitable for feature extraction of the object from among the plurality of captured images in which the object is detected, based on the computed degree of appropriateness.
2. The information processing apparatus according to claim 1, wherein the program code is executable by the one or more processors to further:
   compute the degree of appropriateness of each captured image by further using control information of the image capture apparatus at a time point when the captured image is generated.
3. The information processing apparatus according to claim 2, wherein
   the control information of the image capture apparatus includes any one or more of a focus value and pan-tilt angles.
4. The information processing apparatus according to claim 1, wherein
   the plurality of captured images generated by the image capture apparatus are time-series captured images, and the program code is executable by the one or more processors to further:

compute the degree of appropriateness of each captured image, based on a difference between the captured image and another captured image.

5. The information processing apparatus according to claim 1, wherein the program code is executable by the one or more processors to further:
determine a weight for each indicator value by performing learning processing.

6. The information processing apparatus according to claim 1, wherein the program code is executable by the one or more processors to further:
determine the captured image maximizing the degree of appropriateness computed for the object as the appropriate image for the object.

7. The information processing apparatus according to claim 1, wherein the program code is executable by the one or more processors to further:
determine the captured image of which the degree of appropriateness for the object is equal to or greater than a threshold value as the appropriate image for the object.

8. The information processing apparatus according to claim 1, wherein the program code is executable by the one or more processors to further:
denote a size and a moving velocity of the object by x and y, respectively, within an image capture time interval T by the image capture apparatus that is equal to or less than x/(2*y).

9. The information processing apparatus according to claim 8, wherein the program code is executable by the one or more processors to further:
acquire information indicating the size x and the moving velocity y of the object;
determine the time interval T by using the acquired information; and
set the determined time interval T to the image capture apparatus.

10. A control method executed by a computer, the control method comprising:
detecting an object from each of a plurality of captured images generated by an image capture apparatus;
computing, for each captured image in which the object is detected, a degree of appropriateness representing a degree of suitability for feature extraction of the object, as a weighted mean of one or more indicator values that include an indicator value computed based on control information of the image capture apparatus; and
determining, for the detected object, an appropriate image being a captured image suitable for feature extraction of the object from among the plurality of captured images in which the object is detected, based on the computed degree of appropriateness.

11. A non-transitory storage medium storing a program causing a computer to execute a control method comprising:
detecting an object from each of a plurality of captured images generated by an image capture apparatus;
computing, for each captured image in which the object is detected, a degree of appropriateness representing a degree of suitability for feature extraction of the object, as a weighted mean of one or more indicator values that include an indicator value computed based on control information of the image capture apparatus; and
determining, for the detected object, an appropriate image being a captured image suitable for feature extraction of the object from among the plurality of captured images in which the object is detected, based on the computed degree of appropriateness.

12. The information processing apparatus according to claim 1, wherein the program code is executable by the one or more processors to detect the object from each of the plurality of captured images by:
detecting an image area representing the object from each of the plurality of captured images.

13. The information processing apparatus according to claim 1, wherein the program code is executable by the one or more processors to further:
perform object recognition, including one or both of authentication and classification, using the appropriate image.

14. The control method of claim 10, wherein detecting the object from each of the plurality of captured images comprises:
detecting an image area representing the object from each of the plurality of captured images.

15. The control method of claim 10, further comprising:
performing object recognition, including one or both of authentication and classification, using the appropriate image.

16. The non-transitory storage medium of claim 11, wherein detecting the object from each of the plurality of captured images comprises:
detecting an image area representing the object from each of the plurality of captured images.

17. The non-transitory storage medium of claim 11, wherein the control method further comprises:
performing object recognition, including one or both of authentication and classification, using the appropriate image.

* * * * *